(12) United States Patent  (10) Patent No.: US 9,413,043 B2
Kim et al.  (45) Date of Patent: Aug. 9, 2016

(54) COOLING MEMBER OF IMPROVED ASSEMBLY EFFICIENCY AND BATTERY MODULE EMPLOYED WITH THE SAME

(71) Applicant: LG CHEM, LTD., Seoul (KR)

(72) Inventors: MinJung Kim, Suwon-si (KR); Dal Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 27 days.

(21) Appl. No.: 13/933,958

(22) Filed: Jul. 2, 2013

(65) Prior Publication Data

US 2013/0295422 A1 Nov. 7, 2013

Related U.S. Application Data

(63) Continuation of application No. PCT/KR2012/000103, filed on Jan. 5, 2012.

(30) Foreign Application Priority Data

Jan. 26, 2011 (KR) .................... 10-2011-0007685

(51) Int. Cl.
*H01M 10/50* (2006.01)
*H01M 10/613* (2014.01)
*B60L 11/18* (2006.01)
(Continued)

(52) U.S. Cl.
CPC ....... *H01M 10/5004* (2013.01); *B60L 11/1864* (2013.01); *B60L 11/1874* (2013.01); *B60L 11/1879* (2013.01); *H01M 10/613* (2015.04); *H01M 10/6552* (2015.04); *H01M 10/6554* (2015.04); *B60K 2001/005* (2013.01);
(Continued)

(58) Field of Classification Search
CPC ....................................................... H01M 10/50
USPC ............................................................ 429/72
See application file for complete search history.

(56) References Cited

U.S. PATENT DOCUMENTS 4,574,112 A * 3/1986 Breault ................ F28D 7/0041
429/120
5,354,630 A * 10/1994 Earl .................... H01M 2/0255
429/101
(Continued)

FOREIGN PATENT DOCUMENTS

CN 101454925 A 6/2009
CN 101855100 A 10/2010
(Continued)

OTHER PUBLICATIONS

Hitoshi et al., Electronic Device, JP 2003-243593, Aug. 29, 2003.*
(Continued)

*Primary Examiner* — Patrick Ryan
*Assistant Examiner* — Alex Usyatinsky
(74) *Attorney, Agent, or Firm* — Birch, Stewart, Kolasch & Birch, LLP (57) ABSTRACT

Disclosed herein is a cooling member mounted at a top or a bottom of a battery module configured to have a structure in which a plurality of unit modules, each of which includes one or more battery cells, is arranged in a lateral direction or a battery pack configured to have a structure in which a plurality of battery modules is arranged in a lateral direction to remove heat generated from the battery cells during charge and discharge of the battery cells.

13 Claims, 6 Drawing Sheets

(51) Int. Cl.
*H01M 10/6552* (2014.01)
*H01M 10/6554* (2014.01)
*B60K 1/00* (2006.01)
*H01M 10/6556* (2014.01)

(52) U.S. Cl.
CPC ......... *H01M10/6556* (2015.04); *Y02T 10/7005* (2013.01); *Y02T 10/7061* (2013.01)

(56) References Cited

U.S. PATENT DOCUMENTS

| | | | |
|---|---|---|---|
| 2003/0173063 A1 | 9/2003 | Suzuki | |
| 2004/0168447 A1 | 9/2004 | Sugito et al. | |
| 2006/0214641 A1 | 9/2006 | Cho | |
| 2007/0018610 A1* | 1/2007 | Wegner | H01M 2/0212 320/112 |
| 2009/0325042 A1* | 12/2009 | Koetting | H01M 10/425 429/90 |
| 2010/0307723 A1* | 12/2010 | Thomas | B60H 1/00278 165/104.33 |
| 2011/0189527 A1* | 8/2011 | Michelitsch | H01M 2/1077 429/120 |
| 2011/0212355 A1* | 9/2011 | Essinger | H01M 2/1016 429/120 |
| 2012/0009457 A1 | 1/2012 | Lee et al. | |

FOREIGN PATENT DOCUMENTS

| | | |
|---|---|---|
| JP | 6-338334 A | 12/1994 |
| JP | 7-329581 A | 12/1995 |
| JP | 11-204151 A | 7/1999 |
| JP | 2001-23703 A | 1/2001 |
| JP | 2001-44347 A | 2/2001 |
| JP | 2003-243591 A | 8/2003 |
| JP | 2003-243593 * | 8/2003 |
| JP | 2003-243593 A | 8/2003 |
| JP | 2003-247790 A | 9/2003 |
| JP | 2004-103258 A | 4/2004 |
| JP | 2004-228386 A | 8/2004 |
| JP | 2006-210245 A | 8/2006 |
| JP | 2008-278330 A | 10/2006 |
| JP | 2007-166820 A | 6/2007 |
| JP | 2008-181734 A | 8/2008 |
| JP | 2008-282878 A | 11/2008 |
| JP | 2009-54297 A | 3/2009 |
| JP | 2010-153141 A | 7/2010 |
| JP | 2010-192207 A | 9/2010 |
| JP | 2010-277863 A | 12/2010 |
| KR | 10-2008-0038465 A | 5/2008 |
| KR | 10-2009-0122270 A | 11/2009 |
| KR | 10-2010-0041452 A | 4/2010 |
| KR | 10-2010-0081942 A | 7/2010 |
| WO | WO 2010/037798 A2 | 4/2010 |

OTHER PUBLICATIONS

International Search Report issued in PCT/KR2012/000103, mailed on Aug. 27, 2012.

* cited by examiner

COOLING MEMBER OF IMPROVED ASSEMBLY EFFICIENCY AND BATTERY MODULE EMPLOYED WITH THE SAME

CROSS REFERENCE TO RELATED APPLICATIONS

This application is a Continuation of PCT International Application No. PCT/KR2012/000103 filed on Jan. 5, 2012, which claims priority under 35 U.S.C. §119(a) to Patent Application No. 10-2011-0007685 filed in the Republic of Korea on Jan. 26, 2011, all of which are hereby expressly incorporated by reference into the present application.

TECHNICAL FIELD

The present invention relates to a cooling member of improved assembly efficiency and a battery module including the same and, more particularly, to a cooling member mounted at a top or a bottom of a battery module configured to have a structure in which a plurality of unit modules, each of which includes one or more battery cells, is arranged in a lateral direction or a battery pack configured to have a structure in which a plurality of battery modules is arranged in a lateral direction to remove heat generated from the battery cells during charge and discharge of the battery cells, the cooling member including a thermal conduction member disposed at the top or the bottom of the battery module or the battery pack, the thermal conduction member including an upper plate and a lower plate, which are separated from each other, and a coolant conduit including a first conduit and a second conduit configured to have a hollow structure in which a coolant flows, the first conduit being disposed between the upper plate and the lower plate, the second conduit being integrally connected to the first conduit, the second conduit being disposed at a front and/or a rear of the battery module or the battery pack.

BACKGROUND ART

Recently, a secondary battery, which can be charged and discharged, has been widely used as an energy source for wireless mobile devices. In addition, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells per device. On the other hand, middle or large-sized devices, such as vehicles, use a middle or large-sized battery module having a plurality of battery cells electrically connected to one another because high power and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on the pouch-shaped battery, which uses an aluminum laminate sheet as a sheathing member, because the pouch-shaped battery is light-weight, the manufacturing costs of the pouch-shaped battery are low, and it is possible to easily modify the shape of the pouch-shaped battery.

Battery cells constituting such a middle or large-sized battery module may be secondary batteries which can be charged and discharged. Consequently, a large amount of heat is generated from such high-power, large-capacity secondary batteries during charge and discharge of the batteries. In particular, the laminate sheet of each pouch-shaped battery widely used in the battery module has a polymer material exhibiting low thermal conductivity coated on the surface thereof with the result that it is difficult to effectively lower overall temperature of the battery cells.

If the heat, generated from the battery module during charge and discharge of the battery module, is not effectively removed from the battery module, the heat accumulates in the battery module with the result that deterioration of the battery module is accelerated. According to circumstances, the battery module may catch fire or explode. For this reason, a middle or large-sized battery pack for vehicles, which is a high-power, large-capacity battery including a plurality of middle or large-sized battery modules, needs a cooling system to cool battery cells mounted in the battery pack.

Each battery module mounted in a middle or large-sized battery pack is generally manufactured by stacking a plurality of battery cells with high integration. In this case, the battery cells are stacked in a state in which the battery cells are arranged at predetermined intervals such that heat generated during charge and discharge of the battery cells can be removed. For example, the battery cells may be sequentially stacked in a state in which the battery cells are arranged at predetermined intervals without using an additional member. Alternatively, in a case in which the battery cells have low mechanical strength, one or more battery cells may be mounted in a cartridge to constitute a unit module, and a plurality of unit modules may be stacked to constitute a battery module. The cartridge increases the mechanical strength of the battery cells; however, the cartridge also increases the overall size of the battery module.

In addition, coolant flow channels are defined between the stacked battery cells or between the stacked battery modules such that heat accumulated between the stacked battery cells or between the stacked battery modules is effectively removed.

In particular, in a case in which the cooling structure is based on a water cooling type cooling system, a coolant conduit extends through an integrated thermal conduction member.

Specifically, there is used a cooling member having a structure in which a heat sink connection portion connected to a pipeline is formed in a protruding shape in order to inject a coolant into a flow channel defined in a heat sink and then the heat sink connection portion is inserted into the pipeline by force fitting.

In a case in which the cooling member with the above-stated construction has a plurality of pipelines, however, it is difficult to insert the heat sink connection portion into the respective pipelines by force fitting. Furthermore, the coolant may leak from fastening regions between the heat sink connection portion and the respective pipelines.

Consequently, there is a high necessity for a cooling member which effectively prevents leakage of a coolant, ensures long-term durability, and can be manufactured with improved assembly efficiency and a battery module of excellent safety using the cooling member.

DISCLOSURE

Technical Problem

The present invention has been made to solve the above-mentioned problems, and it is an object of the present invention to provide a cooling member configured to have a structure in which a thermal conduction member is divided into an upper plate and a lower plate, a first conduit is mounted between the upper plate and the lower plate, and a second conduit is disposed at the front and/or the rear of a battery pack.

It is another object of the present invention to provide a cooling member configured to have a structure in which a first conduit and a second conduit are integrally connected to each other such that additional coupling between the first conduit and the second conduit is not necessary, thereby improving assembly efficiency and assembly reliability, and in which a coolant is prevented from leaking from a connection region between the first conduit and the second conduit.

Technical Solution

In accordance with one aspect of the present invention, the above and other objects can be accomplished by the provision of a cooling member mounted at a top or a bottom of a battery module configured to have a structure in which a plurality of unit modules, each of which includes one or more battery cells, is arranged in a lateral direction or a battery pack configured to have a structure in which a plurality of battery modules is arranged in a lateral direction to remove heat generated from the battery cells during charge and discharge of the battery cells, the cooling member including a thermal conduction member disposed at the top or the bottom of the battery module or the battery pack, the thermal conduction member including an upper plate and a lower plate, which are separated from each other, and a coolant conduit including a first conduit and a second conduit configured to have a hollow structure in which a coolant flows, the first conduit being disposed between the upper plate and the lower plate, the second conduit being integrally connected to the first conduit, the second conduit being disposed at a front and/or a rear of the battery module or the battery pack.

In the cooling member according to the present invention, the thermal conduction member is divided into the upper plate and the lower plate. In addition, the first conduit and the second conduit are integrally connected to each other. As previously described, therefore, it is possible to effectively prevent the coolant from leaking from a connection region between the first conduit and the second conduit.

In addition, unlike a conventional cooling member, it is not necessary to form an additional fastening part at a portion of the thermal conduction member in order to connect the first conduit to the thermal conduction member. Consequently, it is possible to greatly improve assembly efficiency and assembly reliability of the cooling member.

In a preferred example, the first conduit may include two or more pipes. As compared with a structure in which the first conduit includes one pipe, therefore, it is possible to improve cooling efficiency of the battery module or the battery pack.

In another example, second conduits may be disposed at the front and the rear of the battery module or the battery pack. In this structure, a coolant, introduced into one of the second conduits, cools the thermal conduction member while flowing along the first conduit and then moves to the other of the second conduits. As a result, the thermal conduction member cools the battery module.

Preferably, the second conduit has a greater diameter than the first conduit. When a coolant introduced into the second conduit flows along the first conduit, therefore, flow velocity of the coolant in the first conduit is higher than that of the coolant in the second conduit. Consequently, it is possible to improve cooling efficiency of the battery module or the battery pack.

In a concrete example, the diameter of the second conduit may be two to five times that of the first conduit. If the diameter of the second conduit is less than twice that of the first conduit, it may be difficult to increase flow velocity of the coolant in the second conduit to a desired level, which is not preferable. On the other hand, if the diameter of the second conduit is greater than five times that of the first conduit, the overall size of the battery module or the battery pack is increased, which is also not preferable. As long as it is possible to exhibit the above-described effects, however, it may be possible to deviate from the above size range.

The shape of the first conduit and the second conduit is not particularly restricted so long as the coolant can effectively flow in the first conduit and the second conduit. For example, in terms of hydrodynamics, the first conduit and the second conduit are preferably formed in a circular shape in vertical section.

Meanwhile, the coolant conduit is preferably formed of a thermally conductive corrosion-resistant material. Consequently, the coolant conduit is prevented from being corroded by the coolant when the coolant flows in the coolant conduit.

The thermal conduction member may be a heat sink. The heat sink is an object that absorbs heat from another object through heat contact and dissipates the absorbed heat outward.

In a preferred example, grooves having a shape corresponding to the first conduit may be formed at portions of the upper plate and the lower plate at which the first conduit is mounted in a longitudinal direction of the thermal conduction member. Consequently, the first conduit may be easily mounted in the grooves formed at the upper plate and the lower plate.

The thermal conduction member may be arranged in various forms. For example, the thermal conduction member may be provided on a per battery module or battery pack basis. That is, divided thermal conduction members may be provided for the respective battery modules or an integrated thermal conduction member may be provided for the battery pack.

Meanwhile, the cooling member may further include cooling fins disposed between the respective unit modules in a state in which opposite sides of each of the cooling fins are in tight contact with corresponding ones of the unit modules. In this case, the coolant sequentially transfers cooling heat to the thermal conduction member and the cooling fins while flowing in the first conduit and the second conduit. The cooling heat may effectively cool the respective unit modules.

In a preferred example of the above structure, the cooling fins may be bent such that the cooling fins contact the thermal conduction member in a surface contact fashion.

That is, in a case in which the cooling fins are disposed between the respective unit modules, it is possible to maximize heat dissipation based on thermal conduction since the cooling fins contact the thermal conduction member in the surface contact fashion.

In another preferred example of the above structure, the shape of each of the cooling fins is not particularly restricted so long as the cooling fins can be disposed in tight contact with the unit modules. For example, each of the cooling fins may be formed in a "⌐" shape or a "T" shape in vertical section. In this case, it is possible to effectively transfer cooling heat from the thermal conduction member to the unit modules.

Specifically, a "T" shape structure may include a combination of an "I" shape and a "T" shape.

The material for the cooling fins is not particularly restricted so long as the cooling fins exhibit excellent thermal conductivity necessary to realize high cooling efficiency. For example, each of the cooling fins may be formed of a metal plate exhibiting high thermal conductivity.

Preferably, each of the battery cells is a plate-shaped secondary battery, which has a small thickness and a relatively large width and length such that the total size of the battery module is minimized when the battery cells are stacked to constitute the battery module. A preferred example of such a plate-shaped secondary battery may be a prismatic secondary battery or a pouch-shaped secondary battery. In particular, a pouch-shaped secondary battery configured to have a structure in which an electrode assembly is mounted in an electrode assembly receiving part formed at a battery case formed of a laminate sheet including a resin layer and a metal layer and a sealed portion ('outer edge sealed portion'), sealed by thermal welding, is formed at the outer edge of the electrode assembly receiving part is preferably used.

Meanwhile, the coolant is not particularly restricted so long as the coolant exhibits high cooling efficiency while easily flowing in the coolant conduit. For example, the coolant may be water, which has high latent heat, thereby maximizing cooling efficiency.

In accordance with another aspect of the present invention, there is provided a battery module including the cooling member with the above-stated construction.

The battery module according to the present invention is configured to have a structure in which a plurality of unit modules, each of which includes one or more battery cells, is arranged in a lateral direction and the cooling member is mounted at the top or the bottom of the battery module. Consequently, it is possible to configure a battery module in which cooling efficiency is greatly improved by a thermal conduction member and a coolant conduit of the cooling member and, at the same time, assembly efficiency is improved.

In accordance with a further aspect of the present invention, there is provided a battery pack including a plurality of battery modules arranged in a lateral direction.

The battery pack includes a plurality of battery modules in order to provide high power and large capacity. Consequently, the battery pack is preferably used as a power source for an electric vehicle, a hybrid electric vehicle, a plug-in hybrid electric vehicle, or a power storage device in which high-temperature heat generated during charge and discharge of the battery modules is a serious safety concern.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
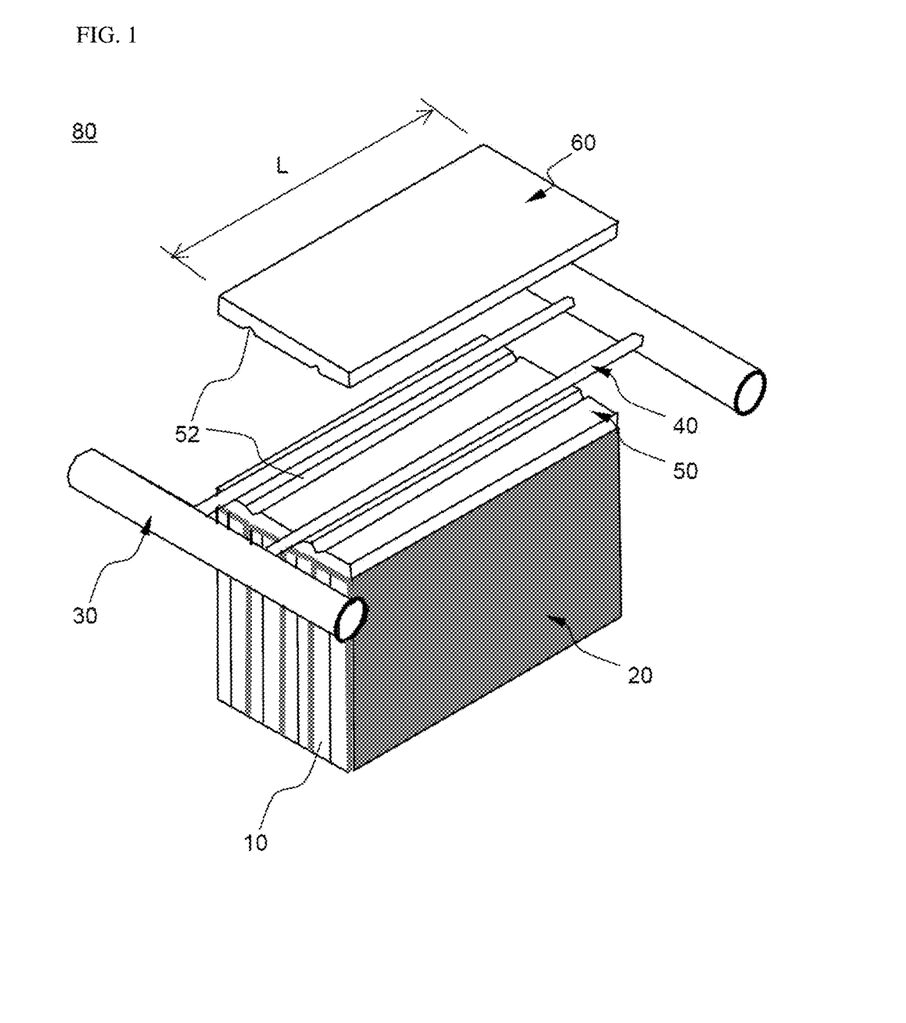
FIG. 1 is a perspective view showing a battery module according to an embodiment of the present invention.
Figure 2:
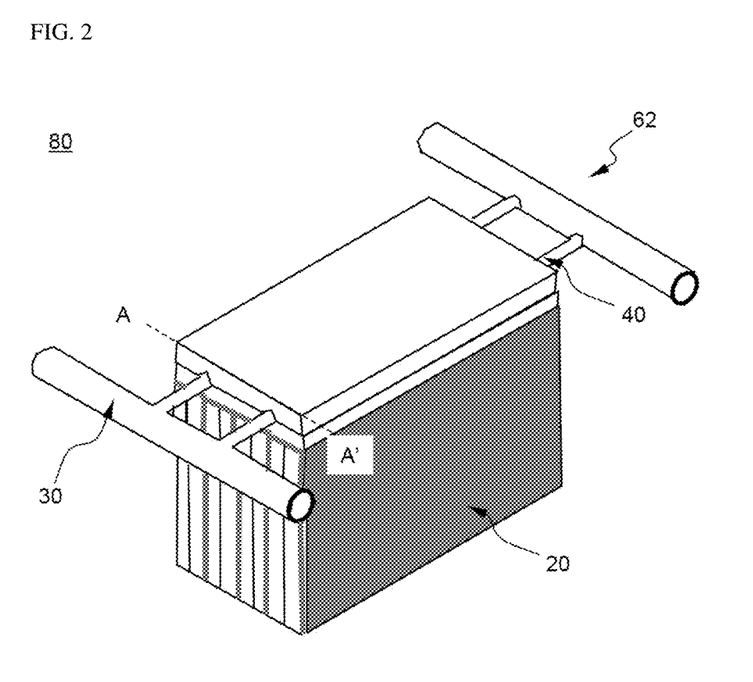
FIG. 2 is a perspective view showing a structure in which an upper plate is mounted to a lower plate in the battery module of FIG. 1.

FIG. 1 is a perspective view typically showing a battery module according to an embodiment of the present invention and FIG. 2 is a perspective view typically showing a structure in which an upper plate is mounted to a lower plate in the battery module of FIG. 1.

Figure 3:
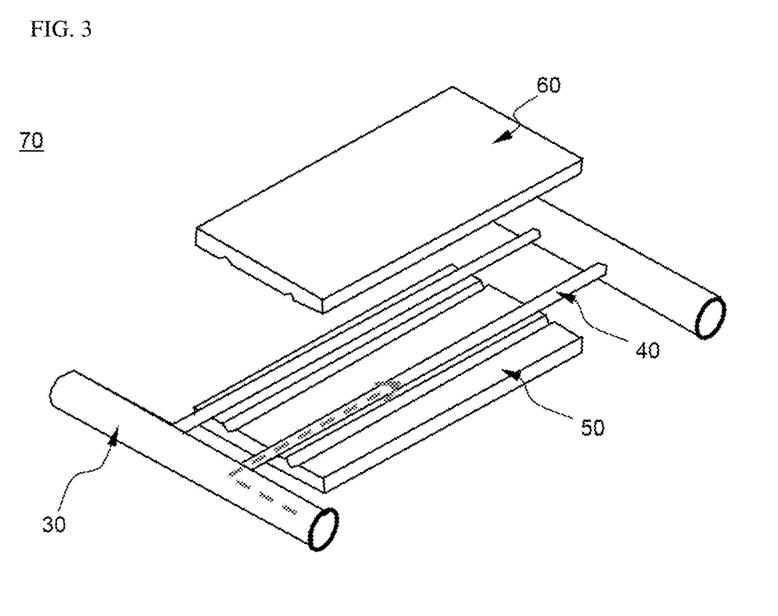
FIG. 3 is an enlarged view showing a cooling member in the battery module of FIG. 1.
Figure 4:
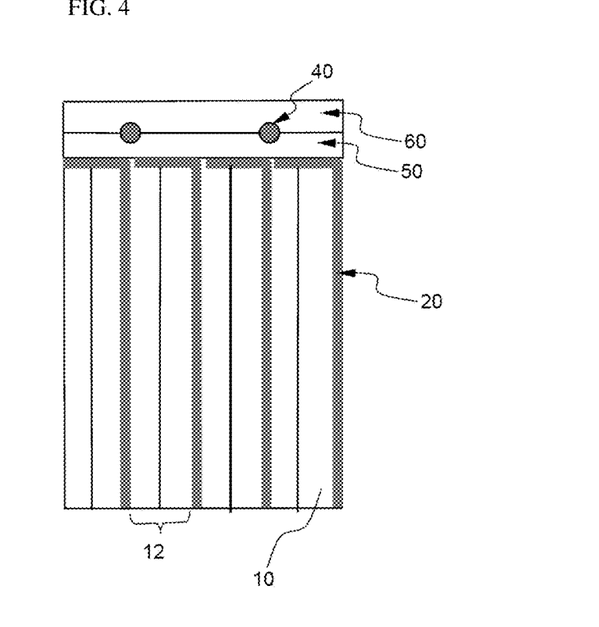
FIG. 4 is a sectional typical view taken along line A-A' of the battery module of FIG. 2.

In addition, FIG. 3 is an enlarged view typically showing a cooling member in the battery module of FIG. 1 and FIG. 4 is a sectional typical view of the battery module of FIG. 2 when viewed from the front of the battery module. In these drawings, electrode terminals of battery cells are not shown for the sake of convenience.

Referring to these drawings, the battery module 80 is configured to have a structure in which three unit modules 12, each of which includes a pair of battery cells 10, are arranged in a lateral direction and a cooling member 62 is mounted at the top of the battery module 10.

The cooling member 62 includes a thermal conduction member disposed at the top of the battery module 80, the thermal conduction member including an upper plate 60 and a lower plate 50, which are separated from each other, and a first conduit 40 and a second conduit 30 configured to have a hollow structure in which a coolant flows.

The first conduit 40 is disposed between the upper plate 60 and the lower plate 50. The second conduit 30 is integrally connected to the first conduit 40. The second conduit 30 is disposed at the front and the rear of the battery module 80.

The first conduit 40 includes two pipes. The second conduit 30 has a greater diameter than the first conduit 40. For example, the diameter of the second conduit 30 is about three times that of the first conduit 40.

The first conduit 40 and the second conduit 30 are formed in a circular shape in vertical section. The first conduit and the second conduit are formed of a corrosion-resistant material such that the first conduit and the second conduit are prevented from being corroded by the coolant.

In addition, grooves 52 having a shape corresponding to the first conduit 40 are formed at portions of the upper plate 60 and the lower plate 50 at which the first conduit 40 is mounted in a longitudinal direction L of the thermal conduction member. When the upper plate 60 covers the lower plate 50 in a state in which the first conduit 40 is mounted in the grooves 52 of the lower plate 50, therefore, coupling between the upper plate 60 and the lower plate 50 is achieved.

Meanwhile, cooling fins 20 are disposed between the respective unit modules 12 in a state in which opposite sides of each of the cooling fins 20 are in tight contact with corresponding ones of the unit modules 12. In addition, the cooling fins 20 are bent such that the cooling fins 20 contact the thermal conduction member in a surface contact fashion.

Each of the cooling fins 20 is formed in a "⌐" shape in vertical section and is formed of a heat conductive metal plate.

Figure 5:
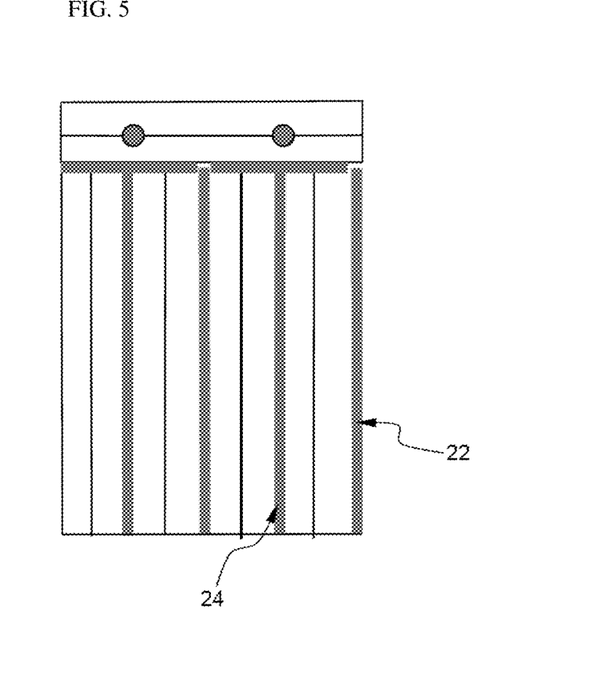
FIG. 5 is a sectional typical view showing cooling fins according to another embodiment of the present invention.

FIG. 5 is a sectional typical view showing cooling fins according to another embodiment of the present invention.

The cooling fins of FIG. 5 are identical in structure to those of FIG. 4 except that the cooling fins are formed in a "T" shape 24 and an "I" shape 22 in vertical section and, therefore, a detailed description will be omitted.

Figure 6:
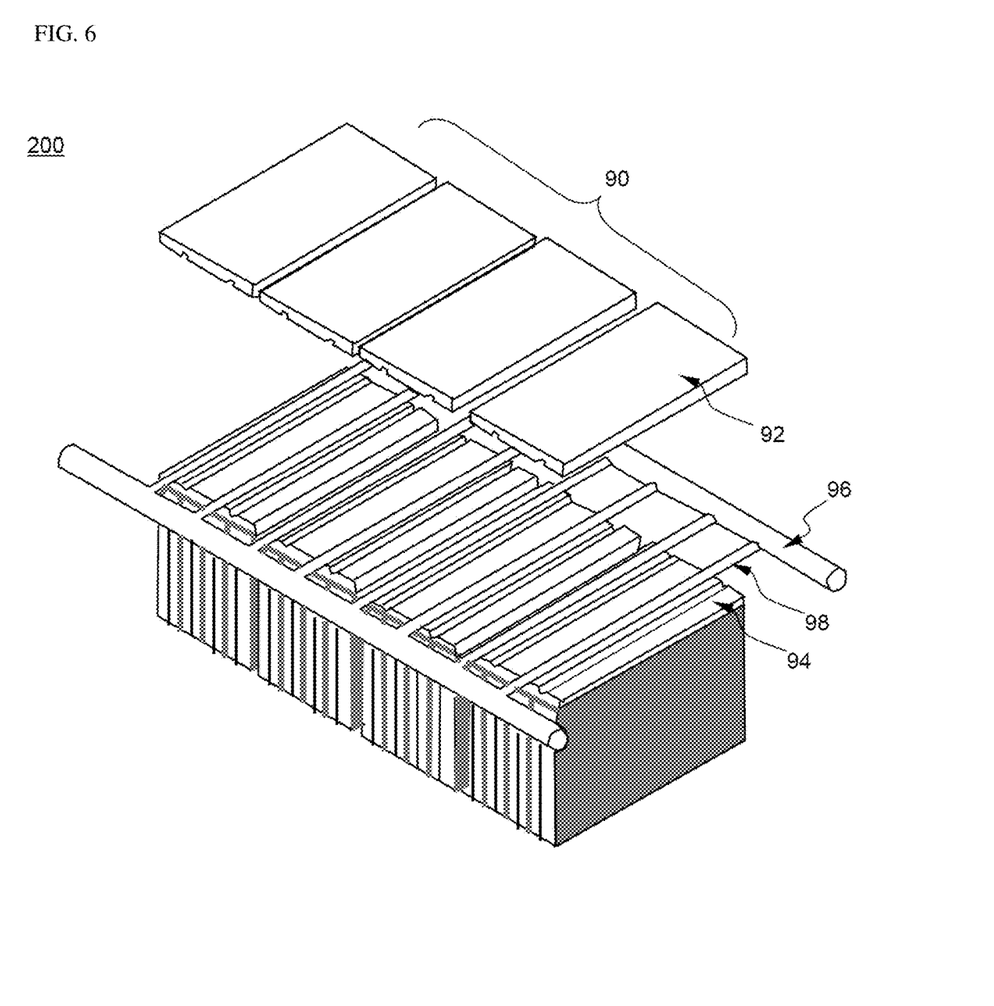
FIGS. 6 and 7 are perspective views showing battery packs according to other embodiments of the present invention.
Figure 7:
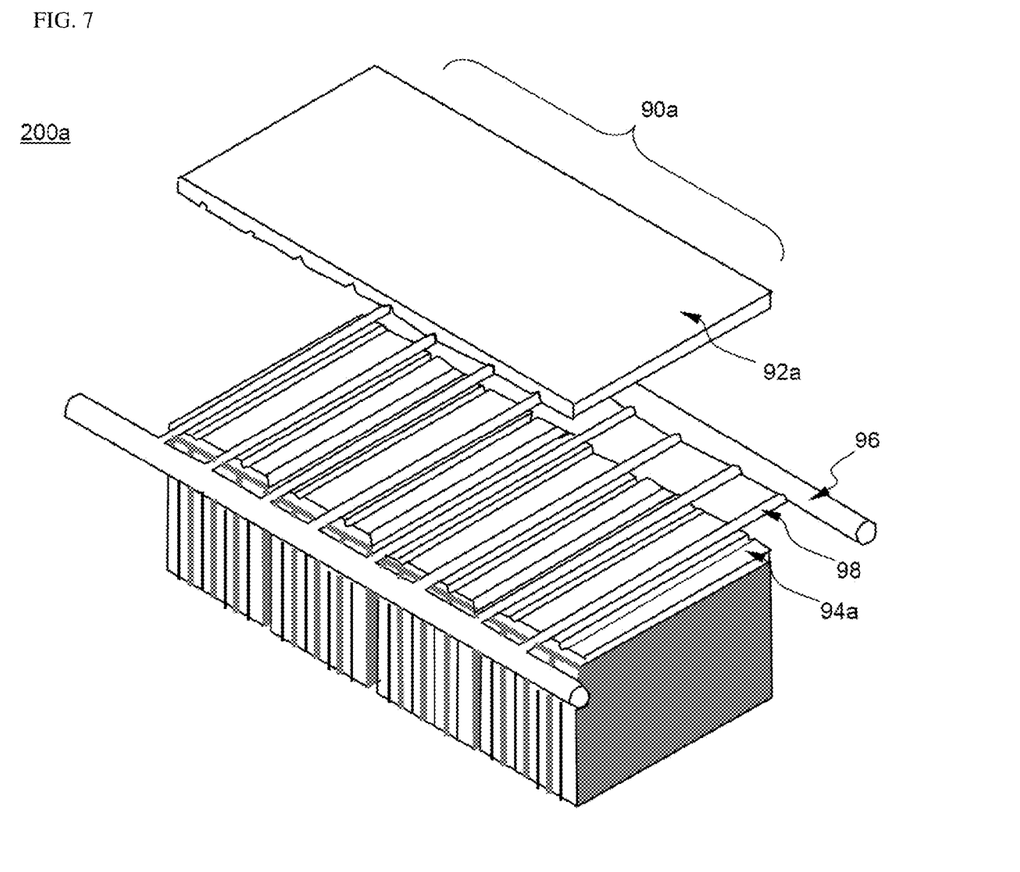
Figure 8:
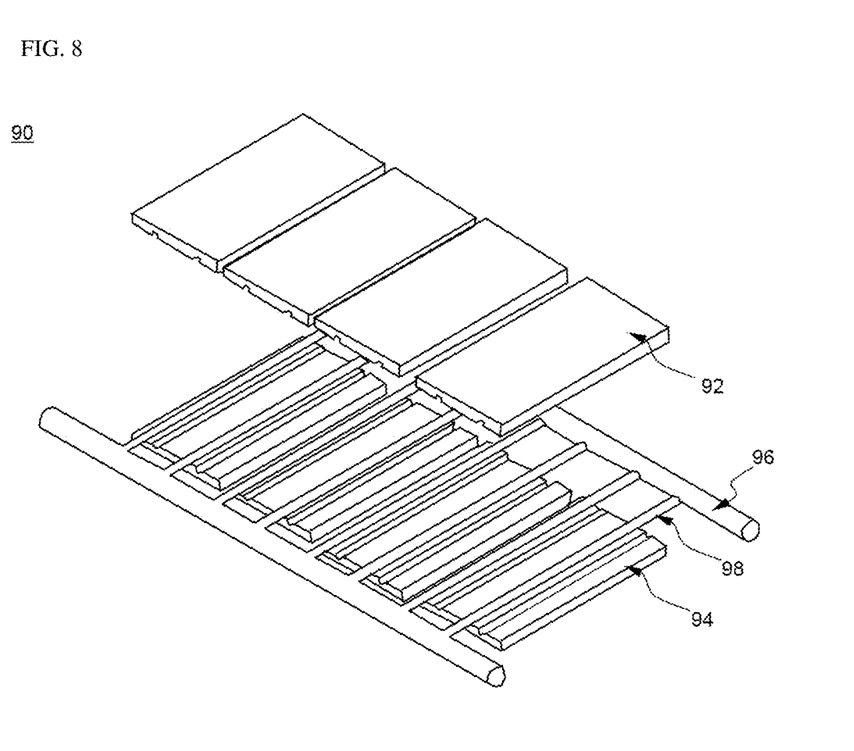
FIG. 8 is a perspective view showing a cooling member of FIG. 6.

FIGS. 6 and 7 are perspective views typically showing battery packs according to other embodiments of the present invention and FIG. 8 is a perspective view typically showing a cooling member of FIG. 6.

Referring to these drawings, a battery pack 200 of FIG. 6 is configured to have a structure in which four battery modules, one of which is shown in FIG. 1, are arranged in a lateral direction and cooling members 90 are mounted at the tops of the respective battery modules per battery module to remove heat generated from battery cells during charge and discharge of the battery cells.

The cooling member 90 includes a thermal conduction member including four upper plates 92 and four lower plates 94, eight first conduits 98, and a pair of second conduits 96.

A battery pack 200a of FIG. 7 is identical to the battery pack 200 of FIG. 6 except that a thermal conduction member includes one upper plate 90a and one lower plate 94a and, therefore, a detailed description will be omitted.

Figure 9:
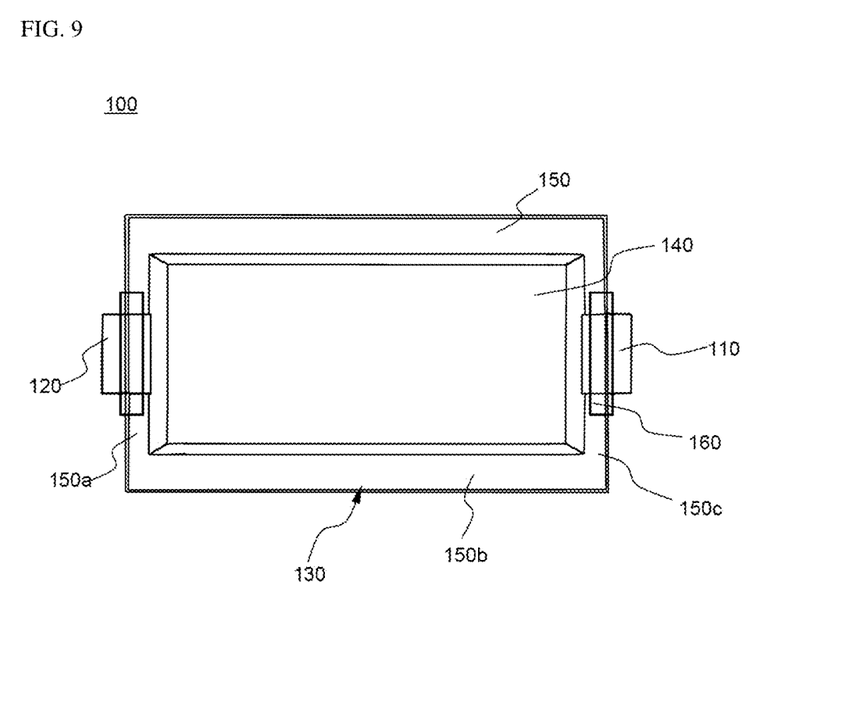
FIG. 9 is a perspective view showing an exemplary plate-shaped battery cell mounted in the battery module according to the present invention.

FIG. 9 is a perspective view typically showing an exemplary plate-shaped secondary battery mounted in the battery module according to the present invention.

Referring to FIG. 9, the plate-shaped secondary battery 100 is configured to have a structure in which two electrode leads 110 and 120 protrude from the upper end and the lower end of a battery case 130 in a state in which electrode leads 110 and 120 are opposite to each other.

The battery case 130 is formed of a laminate sheet including a metal layer and a resin layer. The battery case 130 includes an upper case and a lower case. In a state in which an electrode assembly (not shown) of a cathode/separator/anode structure is mounted in an electrode assembly receiving part 140 formed in the battery case 130, outer edges, i.e. lateral sides 150b, upper ends 150a, and lower ends 150c, of the electrode assembly receiving part 140 are sealed by thermal welding to form a sealed portion 150. As a result, the secondary battery 100 is manufactured.

The electrode leads 110 and 120 protrude from the upper end 150a and the lower end 150c, respectively. For this reason, the upper ends 150a and the lower ends 150c are thermally welded to each other, in a state in which a film type sealing member 160 is interposed between the electrode leads 110 and 120 and the battery case 130, in consideration of the thickness of the electrode leads 110 and 120 and the difference in material between the electrode leads 110 and 120 and the battery case 130, so as to increase sealability of the battery case 130.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a cooling member according to the present invention is configured to have a structure in which a thermal conduction member is divided into an upper plate and a lower plate and a first conduit mounted between the upper plate and the lower plate is integrally connected to a second conduit disposed at the front and/or the rear of a battery module or a battery pack. Consequently, it is possible to provide a battery module or a battery pack that is capable of preventing a coolant from leaking from a connection region between the first conduit and the second conduit and that has improved assembly efficiency and assembly reliability.

In addition, corrosion resistance against the coolant is required only for the coolant conduit constituting the cooling member, thereby reducing manufacturing costs.

The invention claimed is:

1. A cooling member mounted at a top or a bottom of a battery module configured to have a structure in which a plurality of unit modules, each of which comprises one or more battery cells, is arranged in a lateral direction or a battery pack configured to have a structure in which a plurality of battery modules is arranged in a lateral direction to remove heat generated from the battery cells during charge and discharge of the battery cells, the cooling member comprising:

a thermal conduction member disposed at the top or the bottom of the battery module or the battery pack, the thermal conduction member comprising an upper plate and a lower plate, which are separated from each other; and a coolant conduit comprising a first conduit and a second conduit configured to have a hollow structure in which a coolant flows, the first conduit being disposed between the upper plate and the lower plate, the first conduit having a constant thickness, the first conduit having a first end and a second end, the first end and the second end extending in opposite directions from each other, the second conduit being integrally connected to the first conduit, the second conduit being disposed at a front and a rear of the battery module or the battery pack, wherein cooling fins are disposed between the respective unit modules in a state in which opposite sides of each of the cooling fins are in tight contact with corresponding ones of the unit modules, wherein the cooling fins are bent such that the cooling fins contact the thermal conduction member in a surface contact fashion, wherein grooves having a shape corresponding to the first conduit are formed at portions of the upper plate and the lower plate at which the first conduit is mounted in a longitudinal direction of the thermal conduction member, wherein each of the cooling fins is formed in a "₁" shape or a "T" shape in vertical section and each of the cooling fins is formed in a rectangular shape in horizontal section, and wherein each of the battery cells is a plate-shaped battery cell.

2. The cooling member according to claim 1, wherein the first conduit comprises two or more pipes.

3. The cooling member according to claim 1, wherein the second conduit has a greater diameter than the first conduit.

4. The cooling member according to claim 1, wherein the first conduit and the second conduit are formed in a circular shape in vertical section.

5. The cooling member according to claim 1, wherein the coolant conduit is formed of a corrosion-resistant material.

6. The cooling member according to claim 1, wherein the thermal conduction member is a heat sink.

7. The cooling member according to claim 1, wherein the thermal conduction member is provided on a per battery module or battery pack basis.

8. The cooling member according to claim 1, wherein each of the cooling fins is formed of a heat conductive metal plate.

9. The cooling member according to claim 1, wherein the plate-shaped secondary battery is a pouch-shaped secondary battery configured to have a structure in which an electrode assembly of a cathode/separator/anode structure is mounted in a battery case formed of a laminate sheet comprising a resin layer and a metal layer.

10. The cooling member according to claim 1, wherein the coolant is water.

11. A battery module comprising a cooling member according to claim 1.

12. A battery pack comprising a plurality of battery modules according to claim 11, wherein the battery modules are arranged in a lateral direction.

13. The battery pack according to claim 12, wherein the battery pack is used in an electric vehicle, a hybrid electric vehicle, a plug-in hybrid electric vehicle, or a power storage device.

* * * * *